(12) United States Patent
Jain et al.

(10) Patent No.: US 12,124,328 B2
(45) Date of Patent: Oct. 22, 2024

(54) DATA PROCESSING SYSTEM HAVING A MEMORY CONTROLLER WITH INLINE ERROR CORRECTION CODE (ECC) SUPPORT

(71) Applicant: NXP USA, Inc., Austin, TX (US)

(72) Inventors: Diviya Jain, New Delhi (IN); James Andrew Welker, Leander, TX (US)

(73) Assignee: NXP USA, Inc., Austin, TX (US)

( * ) Notice: Subject to any disclaimer, the term of this patent is extended or adjusted under 35 U.S.C. 154(b) by 200 days.

(21) Appl. No.: 17/660,690

(22) Filed: Apr. 26, 2022

(65) Prior Publication Data
US 2023/0342240 A1    Oct. 26, 2023

(51) Int. Cl.
G06F 11/10    (2006.01)

(52) U.S. Cl.
CPC .... *G06F 11/1044* (2013.01); *G06F 2201/805* (2013.01)

(58) Field of Classification Search
None
See application file for complete search history.

(56) References Cited

U.S. PATENT DOCUMENTS

| | | | |
|---|---|---|---|
| 10,061,644 B2 | 8/2018 | Quach et al. | |
| 10,198,310 B1 | 2/2019 | Zhu et al. | |
| 10,346,346 B1 | 7/2019 | Arbel et al. | |
| 10,769,013 B1* | 9/2020 | MacLaren | G06F 3/0619 |
| 10,956,262 B2 | 3/2021 | Golov | |
| 2020/0327010 A1 | 10/2020 | Pandey et al. | |
| 2021/0374056 A1* | 12/2021 | Malladi | G06F 9/30047 |
| 2021/0406171 A1* | 12/2021 | Beaudoin | G06F 12/0879 |

FOREIGN PATENT DOCUMENTS

| | | | | |
|---|---|---|---|---|
| CN | 108665939 B | | 1/2021 | |
| TW | 202145767 A | * | 12/2021 | ......... G06F 12/0646 |

* cited by examiner

*Primary Examiner* — April Y Blair
*Assistant Examiner* — Matthew W Wahlin
(74) *Attorney, Agent, or Firm* — Joanna G. Geld (57) ABSTRACT

A memory controller includes a transaction scheduler circuit and a command queue. For each access request received by the memory controller, the transaction scheduler circuit is configured to allocate a new entry in a scheduler queue, store an access address corresponding to the access request as a data address into the new entry, generate an error correction code (ECC) address from the data address and store the ECC address into the new entry, and set a corresponding ECC mode field in the new entry to indicate whether the data address or ECC address of the new entry is to be exposed during arbitration. The transaction scheduler circuit, during an arbitration cycle, is configured to select a transaction from the scheduler queue using an exposed address of each valid entry, and is configured to provide the selected transaction to the command queue.

20 Claims, 4 Drawing Sheets

DATA PROCESSING SYSTEM HAVING A MEMORY CONTROLLER WITH INLINE ERROR CORRECTION CODE (ECC) SUPPORT

BACKGROUND

Field

This disclosure relates generally to data processing systems, and more specifically, to data processing systems having memory controllers with inline Error Correction Code (ECC) support.

Related Art

Today, memory controllers with ECC support are available which detect and correct errors that result from noise or other impairments. In some instances, application data along with corresponding syndrome bits are transferred in parallel, which minimizes any negative impacts on performance. However, in other systems, such as in lower power systems or systems with less available bus bandwidth, parallel end-to-end ECC protection is not available. In these cases, inline ECC is used in which the ECC syndrome bits are written or read using the same memory interface and memory array as the actual read or write of application data. These solutions typically suffer significant performance penalties for various reasons. For example, a portion of the total available memory bandwidth now has to be shared between reading and writing application data as well as syndrome bits. Also, scheduling of data transactions and ECC transactions for the memory impacts performance as non-optimal fixed interleaving of data transactions with ECC transactions (in which ECC transactions are scheduled together with the data transactions) results in higher read/write turnaround penalties and page conflicts which result in further degradation in performance. Therefore, a need exists for memory controllers with inline ECC support with reduced negative impact on memory performance.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

In one aspect, improved scheduling of data transactions and ECC mode transactions is achieved in a memory controller by allowing transactions to be placed within a shared scheduler queue (Q) such that a scheduler can independently schedule transactions to access memory, agnostic of the transaction type. As used herein, an ECC mode transaction refers to the writing or reading of ECC data to or from the memory, in which ECC data refers to ECC syndrome values or bits (simply referred to as syndrome values or bits). A data transaction refers to the writing or reading of application data to or from the memory, in which application data refers to non-ECC data (i.e. not syndrome bits). A transaction scheduler selects a next transaction from the scheduler Q to be placed into a command queue (Q), in which ECC mode transactions can be selected by the transaction scheduler independent of data transactions such that the scheduling of ECC mode transactions is not tied to the scheduling of the data transactions. In this manner, there is no fixed interleaving in which, for example, multiple data transactions may be scheduled between ECC mode transactions, or vice versa. Improved performance may further be achieved by combining partial ECC writes from more than one ECC mode transaction. Also, the use of a scheduler Q for both data and ECC mode transactions avoids the need for increased area and time complexity for implementing the transaction scheduling.

Figure 1:
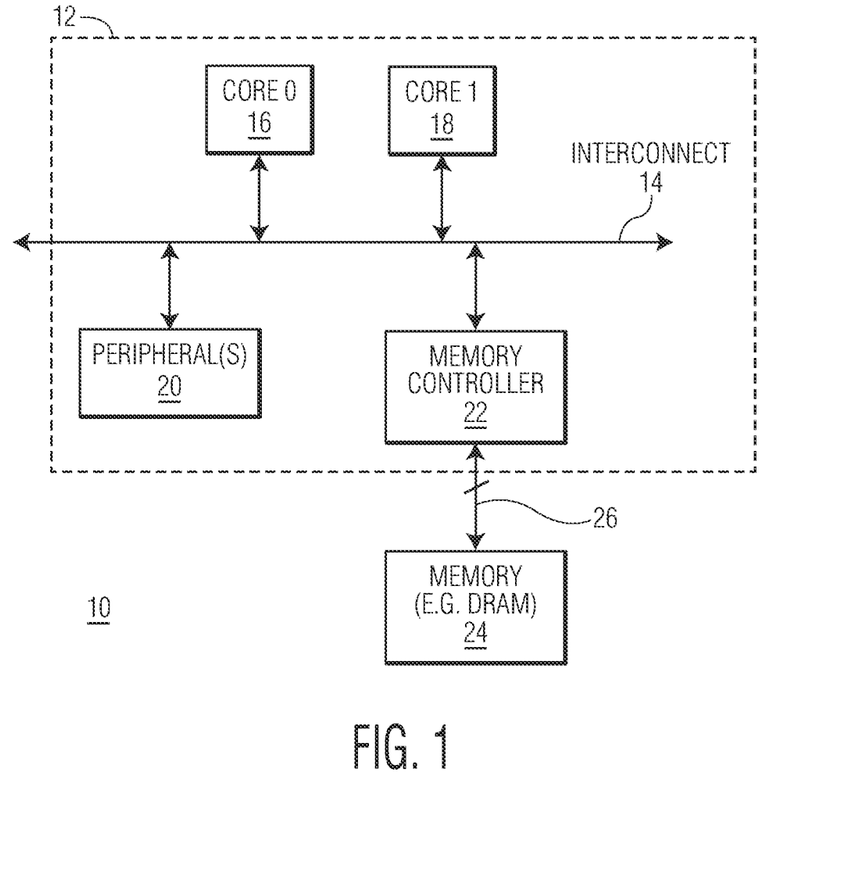
FIG. 1 illustrates, in block diagram form, a data processing system in accordance with one embodiment of the present invention.

FIG. 1 illustrates, in block diagram form, a data processing system 10 having a system on a chip (SoC) 12 and a memory 24, in accordance with one embodiment of the present invention. SoC 12 may also be referred to as an integrated circuit (IC), and memory 24 may be implemented on the same IC or may be in a separate IC. For example, in one embodiment, SoC 12 is a microcontroller which may be used in a vehicle. Alternatively, SoC 12 can be any type of device used in any type of application. SoC 12 includes two cores (which may be referred to as master devices), including core 0 and core 1, and may therefore be referred to as a multicore device. SoC 12 may include any number of master devices, including, for example, one or more cores, hardware accelerators, peripherals, etc.

SoC 12 includes an interconnect 14, core 0 16 core 1 18, peripherals 20, and a memory controller 22. Peripherals 20 may include any number (one or more) and type of peripherals, or may not be present at all. Each of the cores, memory controller 22, and peripherals 20 are bidirectionally connected to interconnect 14, which may be implemented as any type of interconnect, such as, for example, a bus, crossbar switch, interconnect fabric, etc. Memory 24 can be any type of volatile or non-volatile memory. In one embodiment, memory 24 is a dynamic random access memory (DRAM), such as, for example, a low power dual data rate (LPDDR) DRAM which can implement, for example, LPDDR4.

Memory controller 22 interfaces with memory 24 via a memory bus 26. In one embodiment, memory controller 22 provides burst writes to memory 24. For example, memory bus 26 may include a 16-bit data-bus (capable of communicating 2 bytes at a time), in which a minimum burst length is 16 (which results in providing at least 16*2 bytes=32 bytes of data per burst transaction). As will be described in more detail below, burst writes may be performed for application data write transactions as well as for ECC mode write transactions. In one embodiment, an 8-bit syndrome is generated for each 8 bytes of application data. In this example, a burst write which writes 32 bytes of application data requires 4 bytes of ECC data.

In operation, any master within SoC 12, such as core 0 or core 1 or any other master device generates write and read requests which are provided via interconnect 14 to memory controller 22. In response, memory controller 22 performs the write and read transactions to or from memory 24, utilizing in-line ECC generation/checking. For each write transaction (burst or not burst), application data is stored at the access address of the write request and corresponding ECC data generated from the application data is stored at an ECC address generated from the access address. For each read transaction, an ECC check is performed on the read data from the access address of the read request with the corresponding ECC data read from the ECC address. Depending on the ECC algorithm used for generating the syndrome bits, the ECC check may either correct single bit errors, or may flag an unrecoverable bit error. As will be discussed below, though, the writing or reading of application data and ECC data are not necessarily performed in a same transaction or even within subsequent transactions.

Figure 2:
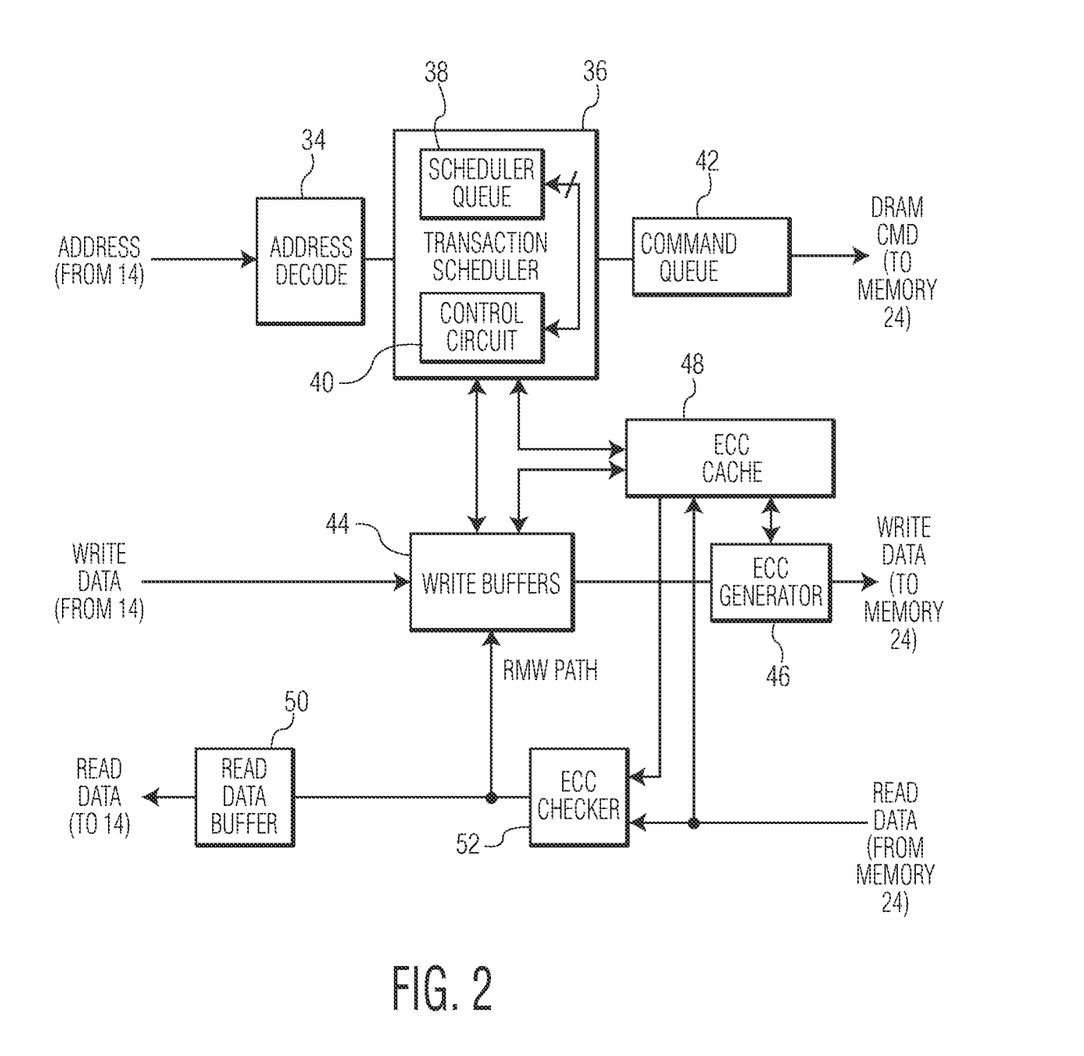
FIG. 2 illustrates, in block diagram form, a memory controller of the data processing system of FIG. 1, in accordance with one embodiment of the present invention.

FIG. 2 illustrates, in block diagram form, a more detailed view of a portion of memory controller 22, in accordance with one embodiment of the present invention. Memory controller 22 includes an address decode circuit 34 (i.e. address decode 34), a transaction scheduler circuit 36 (i.e. transaction scheduler 36), a command queue (Q) 42, an ECC cache 48, write buffers 44, an ECC generator 46, a read data buffer 50, and an ECC checker 52. Transaction scheduler 36 includes a scheduler queue (Q) 38 and a control circuit 40 coupled to scheduler Q 38. Read and write requests for memory 24 are provided from a master of SoC 12 to memory controller 22 via interconnect 14. Each read or write request has a corresponding access address and corresponding control information (such as a R/W indicator to indicate whether the request is a read request or write request). Access addresses for the read and write requests are received via interconnect 14 and provided to address decode circuit 34. Address decode 34 is coupled to transaction scheduler 36, in which control circuit 40 places read and write data transactions corresponding to the received read and write requests into scheduler Q 38. When a read or write data transaction is loaded into scheduler Q 38, control circuit 40 also places any information needed for the corresponding ECC mode transaction into the same entry of scheduler Q 38. (Scheduler Q 38 and its operation will be described in more detail below in reference to FIGS. 3-5.) Transaction scheduler 36 selects transactions from scheduler Q 38 to place into command Q 42, in which command Q 42 schedules the transactions to memory 24. In one embodiment, command Q 42 provides commands to memory 24 in a first-in first-out (FIFO) order. In the case that memory 24 is a DRAM, the commands stored in command Q 42 and provided to memory 24 are referred to as DRAM commands (cmds).

For write requests, write data is also provided via interconnect 14 to memory controller 22 as part of the corresponding write request. The write data is provided to write buffers 44, and then to ECC generator 46 to generate ECC data (e.g. syndrome bits) in accordance with an ECC algorithm. Therefore, each of the write data and the corresponding ECC data are provided with write commands to memory 24. Note that an ECC cache 48 may be used to store ECC data. In one example, the write data and corresponding syndrome bits are also stored to ECC cache 48 in accordance with a cache policy of ECC cache 48. Although, in the illustrated embodiment, ECC generator 46 is located after write buffers 44, in an alternate embodiment, the ECC generation can be done prior to storing the write data in write buffers 44. In this case, ECC generator 46 would be located prior to write buffers 44.

For read requests, read data is received from memory 24. The read data is stored in read data buffer 50 prior to being provided to the requesting master via interconnect 14. In alternate embodiments, a read data buffer may not be present in controller 22. For each read transaction, the corresponding ECC data is received and used to perform ECC checking and correcting by ECC checker 52. The corresponding ECC data can be received by ECC checker 52 from memory 24 or can be received from ECC cache 48 in the case of a cache hit in ECC cache 48. Note that ECC cache 48 is optional, and may not be present. ECC checker 52 uses the received ECC data to check, and if possible, correct, bit errors in the read data prior to storing the read data into read buffer 50 (or prior to providing the read data back to the requesting master). In one embodiment, if ECC checker 52 finds an error in the data from memory 24, any known method may be used to correct the single bit error for storage into memory 24.

Figure 3:
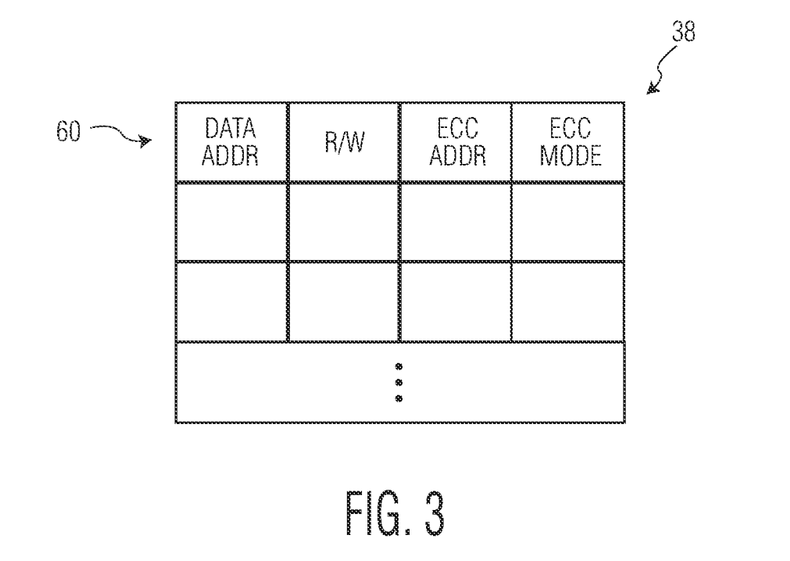
FIG. 3 illustrates, in diagrammatic form, a scheduler queue (Q) of the memory controller of FIG. 2, in accordance with one embodiment of the present invention.

FIG. 3 illustrates, in diagrammatic form, scheduler Q 38 in accordance with one embodiment of the present invention. Scheduler Q 38 includes N entries, in which N can be any number greater than or equal to one. In one example, scheduler Q 38 includes 20 entries. Each entry includes the information illustrated in first entry 60, therefore, entry 60 will be used as an example entry to describe scheduler Q 38. Entry 60 includes a data address field which includes the access address corresponding to the request (which was received with the request), a read/write (R/W) indicator field to indicate whether the request is a read or write request (in which the R/W may be a one-bit field), an ECC address field which includes the ECC address for the ECC data corresponding to the request (which was generated from the access address), and an ECC mode field (which, in one embodiment, is a one-bit field and may also be referred to as an ECC status field). Note that, in alternate embodiments, scheduler Q 38 may include more fields or fewer fields, as needed, each entry may be organized differently, and each field may include any number of bits, as needed. For example, each entry may also include a valid field which can be used to indicate whether the corresponding entry is currently valid or is empty. A valid entry refers to an entry that is filled with valid information corresponding to a received request. Usage of scheduler Q 38 will be described in reference to FIGS. 4 and 5.

Figure 4:
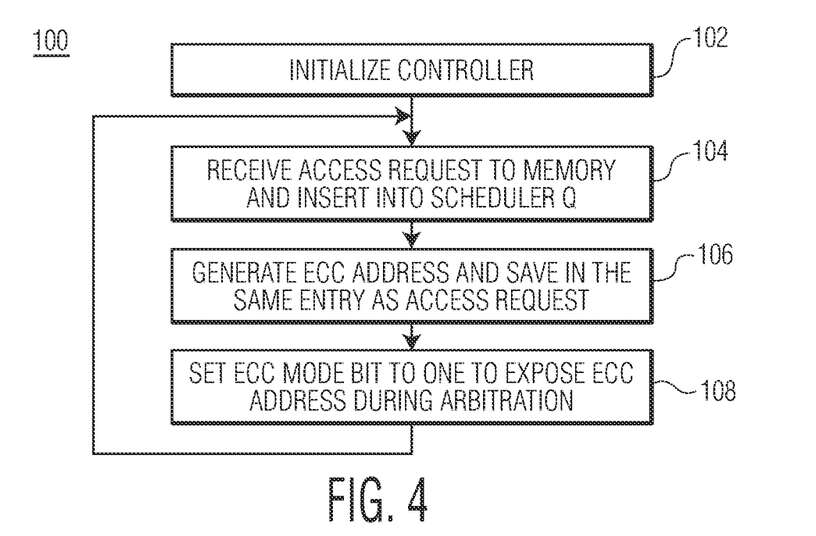
FIG. 4 illustrates, in flow diagram form, a method of storing transactions to a scheduler queue (Q) of the memory controller of FIG. 2, in accordance with one embodiment of the present invention.

FIG. 4 illustrates, in flow diagram form, a method 100 of storing transactions to scheduler queue (Q) 38 of memory controller 22, in accordance with one embodiment of the present invention. Method 100 begins in block 102 by initializing memory controller 22. In block 104, control circuit 40 receives an access request (i.e. a user request, which can either be a write access request or a read access request), and places it into scheduler Q 38. In doing so, a new entry is allocated in scheduler Q 38, and the received access address of the access request is stored as the data address in the new allocated entry, along with the R/W indicator. Note that, if the access request is a write request, the corresponding write data is stored in write buffers 44, and ECC generator 46 generates the syndrome bits (the ECC data) corresponding to each write data. This ECC data has a corresponding ECC address where it will be stored within memory 24. The ECC address can be any address location in memory 24, and transaction scheduler 36 generates the ECC address using the access address of the received access request. In block 106, the ECC address is also stored in the same newly allocated entry of scheduler Q 38, since the ECC address also corresponds to the same access request. In one embodiment, the full ECC address is stored in scheduler Q 38, in which the data address and ECC address fields in each entry of scheduler Q 38 are equal in size. In an alternate embodiment, when the ECC address is derived from the access address, fewer than the full address needs to be stored in the ECC address field. For example, in one such embodiment, the data address stored in the allocated entry may be 32 bits, but only 6 bits may be needed for the ECC address field, in which the additional 6 bits in combination with the access address is sufficient to determine the full ECC address.

Note that in an entry of scheduler Q 38 for an access request, the data address corresponds to the address for a data transaction (e.g. the data address in memory 24 to which write data will be written or from which read data will be read), and the ECC address corresponds to the address for an ECC mode transaction (e.g. the ECC address in memory 24 to which ECC data will be written or from which the ECC data will be read). Therefore, each valid entry includes both a data transaction and an ECC mode transaction for the corresponding access request, and as will be seen in reference to FIGS. 4 and 5, these can be scheduled independently of each other. Note that in allocating a new entry in scheduler Q 38 for an access request, an empty entry (or any available entry) can be selected as the new entry. Also, in alternate embodiments, the ECC circuitry, including the ECC generator and ECC checker, can be located in different places within memory controller 22, or may be distributed differently than as illustrated. Similarly, the different circuits of memory controller 22, such as the write buffers, the read data buffer, and the ECC cache can be organized differently than as illustrated in FIG. 2.

Still referring to FIG. 4, in block 108, the ECC mode bit is set to a logic level one to expose the ECC address of the entry (among multiple entries of scheduler Q 38) during arbitration. The ECC mode bit of an entry indicates which address to expose for the entry of scheduler Q 38 during arbitration, as will be described in more detail in FIG. 5. In one embodiment, when the ECC mode bit is a logic level one, the ECC address of the entry (corresponding to an ECC mode transaction) is exposed during arbitration. However, when the ECC mode bit is a logic level zero, the data address of the entry (corresponding to a data transaction) is instead exposed during arbitration. In an alternate embodiment, both the data address and the ECC address stored in the entry can be exposed during arbitration, and transaction scheduler 36 can select either one based on the selection algorithm. In this embodiment, the ECC mode field may include more than one bit in order to indicate this option as well. Also, with respect to block 108, in embodiments which utilize ECC cache 48, if the ECC data is already available, then the ECC mode bit will not be set when the new transaction is loaded. Method 100 then returns to block 104 for a next received access request. Note that each of blocks 104, 106, and 108 can be performed simultaneously or partially overlap. Alternatively, they can each be performed in separate cycles.

Figure 5:
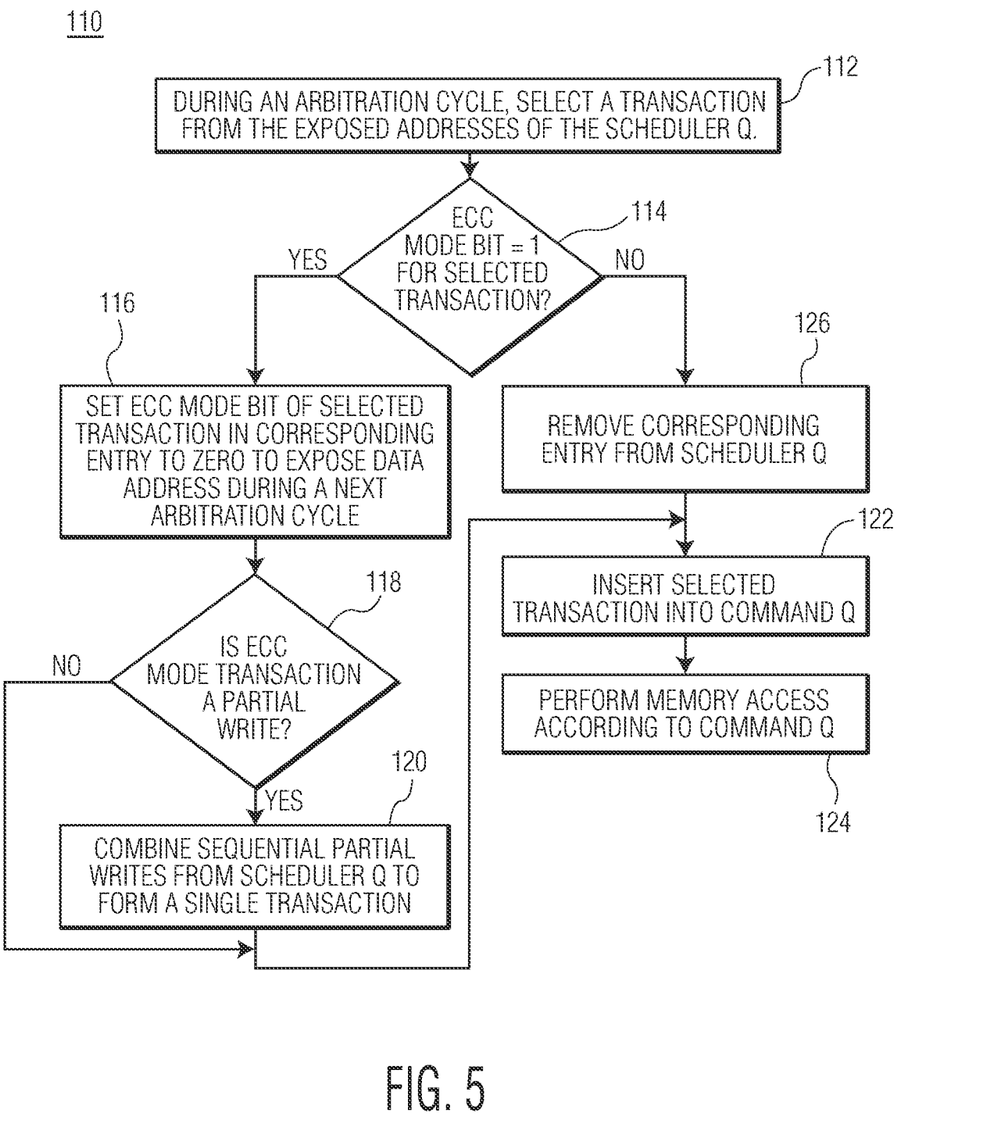
FIG. 5 illustrates, in flow diagram form a method of processing the scheduler Q of the memory controller of FIG. 2, in accordance with one embodiment of the present invention.

FIG. 5 illustrates, in flow diagram form, a method 110 for processing scheduler Q 38 of memory controller 22, in accordance with one embodiment of the present invention. Scheduler Q 38 is created in accordance with received access requests, as was described above in reference to FIG. 4. Control circuit 40 of transaction scheduler 36 selects transactions from scheduler Q 38 to be inserted into command Q 42. Therefore, in block 112 of FIG. 5, during an arbitration cycle of transaction scheduler 36, a transaction is selected from scheduler Q 38 using the exposed addresses. Each valid (e.g. non-empty) entry of scheduler Q 38 has one exposed address, either the data address or the ECC address, depending on the ECC mode bit.

Any arbitration scheme can be used to select a next transaction from scheduler Q 38, in which, for example, a next transaction can be selected based on performance factors. In one embodiment, such as in the case of accessing a DRAM, the performance factors include memory page utilization in which transactions can be scheduled so as to minimize the opening and closing of pages of the DRAM. During arbitration, control circuit 40 can select any transaction (i.e. any exposed address) from scheduler Q 38, regardless of whether the selected transaction is a data transaction or ECC transaction (i.e. regardless of whether the selected exposed address corresponds to the data address or the ECC address). In this manner, control circuit 40 can select an ECC mode transaction of an entry of scheduler Q 38 independent from the data transaction of the entry. Further, the selection by control circuit 40 can be made agnostic of the type of transaction (i.e. the selection can be made without differentiation between data transaction types and ECC mode transaction types).

Once a transaction is selected in block 112, it is determined, at decision diamond 114, whether the ECC mode bit of the selected transaction is a one or not. If so, method 110 proceeds to block 116 in which the ECC mode bit of the selected transaction in the corresponding entry is set to zero in order to now expose the data address during future arbitration cycles. That is, since during creation of scheduler Q 38 as described in FIG. 4, the ECC mode bit of each newly created entry is set to one, the ECC address (corresponding to the ECC mode transaction of the entry) will be exposed first, prior to exposing the data address. In this manner, for this embodiment, the ECC mode transaction of an entry will always be selected first during arbitration, prior to the data transaction of the same entry. (However, note that in alternate embodiments, there may be situations in which the ECC mode bit is initially set to zero in block 108 of FIG. 5 so as to expose the data address first.)

At decision diamond 118, it is determined if the selected ECC mode transaction is a partial write transaction (in which, for example, less than the full burst length is to be written for the transaction). If so, then, at block 120, multiple sequential partial writes in scheduler Q 38 can be combined to form a single transaction which is provided at block 122 as the selected transaction to command Q 42. If it is not a partial write (e.g. if it is a read or a full burst write), then method 110 bypasses block 120 and continues directly to block 122 in which the selected transaction is inserted into command Q 42 without combination with other transactions. In alternate embodiments, combination of partial writes may not be supported, in which method 110 would proceed from block 116 directly to block 122.

If, at decision diamond 114, the ECC mode bit of the selected entry is a zero, then in block 126, the selected entry is removed from scheduler Q 38. In this case, if there was a corresponding ECC mode transaction for the selected entry, it was already previously scheduled and provided to command Q 42. Therefore, upon scheduling the data transaction, the entry can be removed or deleted from scheduler Q 38. After block 126, method 110 also proceeds to block 122 in which the selected transaction (from the removed entry) is inserted into command Q 42.

In an alternate embodiment of FIG. 5, the data addresses for each entry of scheduler Q 38 may be exposed first prior to exposing the ECC address. In this embodiment, the ECC mode bit can initially be set to zero to expose the data address during arbitration (such as in block 108 of FIG. 4), in which, in decision diamond 114, it is determined whether the ECC mode bit for the selected transaction is a zero, and if so, in block 116, the ECC mode bit is set to one to expose the ECC address next. In this example, the data transaction, rather than the ECC mode transaction, will be provided as the selected transaction to command Q 42. Similarly, in this example, if the ECC mode bit for the selected transaction was instead a one at decision diamond 114, then the ECC mode transaction is provided as the selected transaction to command Q 42, in which the entry for the selected transaction can be deleted from scheduler Q 38 (since the data transaction was previously scheduled). (Also, as with the embodiment of FIG. 5, providing the ECC mode transaction as the selected transaction to command Q 42 can also include combining multiple partial writes, if partial writes is enabled.)

As indicated above, command Q 42 may operate in accordance with a FIFO ordering. Alternatively, command Q 42 may perform reordering of the commands in scheduling them to memory 24. Therefore, at block 124, memory access to memory 24 can be performed in accordance with command Q 42, in which each transaction can be processed in the appropriate transaction order as determined by command Q 42 (e.g. in a FIFO order) by providing the appropriate read or write command to memory 24. Note that memory controller 22 may include other circuitry (such as additional decoders and read/write circuitry, etc.) to fully perform the memory transactions but are not illustrated in order to simply the block diagram of FIG. 2.

Therefore, by now it can be appreciated how improved scheduling of data transactions and corresponding ECC mode transactions can be achieved through the use of a shared scheduler Q for the transactions. For example, each entry of the scheduler Q can include information for both a data transaction as well as an ECC transaction, in which each type of transaction can be separately selected and scheduled in a command Q. Also, an ECC mode bit per entry can be used to provide further flexibility by indicating which access address to expose first (i.e. which transaction type to schedule first between the two transaction types). In this manner, the scheduler can independently schedule transactions to access a memory, agnostic of the transaction type, which avoids fixed interleaving which can inversely impact performance.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Each signal described herein may be designed as positive or negative logic, where negative logic can be indicated by a bar over the signal name or an asterisk (*) following the name. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the invention is described herein with reference to specific embodiments, various modifications and changes can be made without departing from the scope of the present invention as set forth in the claims below. For example, the memory controller may correspond to any type of memory. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

The following are various embodiments of the present invention.

In one embodiment, a memory controller is configured to receive access requests to access a memory in which the memory controller includes a transaction scheduler circuit and a command queue. The transaction scheduler circuit includes a scheduler queue, wherein for each received access request, the transaction scheduler circuit is configured to allocate a new entry in the scheduler queue, store an access address corresponding to the access request as a data address into the new entry, generate an error correction code (ECC) address from the data address and store the ECC address into the new entry, and set a corresponding ECC mode field in the new entry to indicate whether the data address or ECC address of the new entry is to be exposed during arbitration. The transaction scheduler circuit, during an arbitration cycle, is configured to select a transaction from the scheduler queue using an exposed address of each valid entry, and configured to provide the selected transaction to the command queue. In one aspect of this embodiment, when the selected transaction is selected with an exposed data address, the selected transaction corresponds to a data transaction, and when the selected transaction is selected with an exposed ECC address, the selected transaction corresponds to an ECC mode transaction. In a further aspect, the data transaction includes a read transaction to read application data from the memory or a write transaction to write application data to the memory, and the ECC mode transaction includes a read transaction to read syndrome bits from the memory or to write syndrome bits to the memory. In yet a further aspect, the command queue is configured to, for each transaction in the command queue, provide a read command or write command to the memory in accordance with a first transaction ordering. In another aspect of the above embodiment, each valid entry of the scheduler queue is configured to store a corresponding data address for a data transaction and a corresponding ECC address for an ECC mode transaction, but is configured to expose only one of the corresponding data address and corresponding ECC address during arbitration based on a corresponding ECC mode field of the valid entry. In a further aspect, the transaction scheduler circuit, during arbitration, is configured to schedule the ECC mode transaction of a corresponding valid entry of the scheduler queue independently of the data transaction of the corresponding valid entry of the scheduler queue. In yet a further aspect, during arbitration, the transaction scheduler circuit is configured to select at least one other transaction corresponding to another valid entry of the scheduler queue between scheduling the ECC mode transaction of the corresponding valid entry and scheduling the data transaction of the corresponding valid entry. In yet another aspect, the memory controller further includes write buffers configured to store write data provided with received write access requests; and an error correction code (ECC) generator configured to generate syndrome bits corresponding to write data received with a corresponding write access request. In a further aspect, the write data for a received write access request is stored at a corresponding data address and the corresponding syndrome bits are stored at a corresponding ECC mode address generated from the corresponding data address. In yet a further aspect, the transaction scheduler circuit is configured to store the corresponding data address and a value indicative of the ECC mode address to a first entry of the scheduler queue, wherein the transaction scheduler circuit is configured to schedule an ECC mode transaction with the ECC mode address of the first entry prior to scheduling a data mode transaction with the data address of the first entry. In yet an even further aspect, when the transaction scheduler circuit is configured to delete the first entry after scheduling the data mode transaction with the data address of the first entry. In an other further aspect, the transaction scheduler circuit is configured to store the corresponding data address and a value indicative of the ECC mode address to a first entry of the scheduler queue, wherein the transaction scheduler circuit is configured to schedule an ECC mode transaction with the ECC mode address of the first entry after scheduling a data mode transaction with the data address of the first entry.

In another embodiment, a method of scheduling memory transactions includes receiving a memory access request for accessing a memory, the memory access request having a corresponding access address; storing the access address to an allocated entry of a transaction scheduler, the access address providing a data address of a data transaction corresponding to the access request; using the data address to generate an error correction code (ECC) address of an ECC mode transaction corresponding to the access request; storing an indication of the ECC address into the allocated entry; and setting an ECC mode field corresponding to the access address in the allocated entry to indicate whether the data address or the ECC address of the allocated entry is exposed during arbitration. In one aspect of the another embodiment, the method further includes, during an arbitration cycle, selecting a transaction from the scheduler queue using exposed addresses of the scheduler queue; if the selected transaction has an exposed ECC mode address, the selected transaction is an ECC mode transaction for reading syndrome bits from the memory or writing syndrome bits to the memory; if the selected transaction has an exposed data address, the selected transaction is a data transaction for reading application data from the memory or writing application data to the memory; and providing the selected transaction to a command queue. In a further aspect, the method further includes, when the selected transaction is the ECC mode transaction, setting an ECC mode field of an entry of the scheduler queue corresponding to the selected transaction to expose the data address during a future arbitration cycle, and when the selected transaction is the data transaction, removing the entry of the scheduler queue corresponding to the selected transaction. In another aspect, the method further includes, when the selected transaction is the data transaction, setting an ECC mode field of an entry of the scheduler queue corresponding to the selected transaction to expose the ECC address during a future arbitration cycle, and when the selected transaction is the ECC mode transaction, removing the entry of the scheduler queue corresponding to the selected transaction. In another aspect, the method further includes providing a read command or write command to the memory for each transaction of the command queue in accordance with a first in first out (FIFO) ordering.

In yet another embodiment, a memory controller is configured to receive access requests to access a memory, and the memory controller includes a transaction scheduler circuit having a scheduler queue. For each received access request, the transaction scheduler circuit is configured to allocate a new entry in the scheduler queue, store an access address corresponding to the access request as a data address into the new entry, generate an error correction code (ECC) address from the data address and store the ECC address into the new entry, and set a corresponding ECC mode field in the new entry to indicate whether the data address or ECC address of the new entry is to be exposed during arbitration. Each valid entry of the scheduler queue is configured to store a corresponding data address for a data transaction and a corresponding ECC address for an ECC mode transaction, but is configured to expose only one of the corresponding data address and corresponding ECC address during arbitration based on an corresponding ECC mode field of the valid entry. In one aspect of the yet another embodiment, the memory controller further includes a command queue, wherein the transaction scheduler circuit, during an arbitration cycle, is configured to select a transaction from the scheduler queue based on exposed addresses of the valid entries, and configured to schedule the selected transaction by providing the selected transaction to the command queue, and wherein the command queue is configured to provide a read command or write command to the memory for each transaction of the command queue. In a further aspect, the transaction scheduler circuit, during arbitration, is configured to schedule at least one other transaction corresponding to one or more entries of the scheduler queue between scheduling the ECC mode transaction of a valid entry and scheduling the data transaction of the valid entry.

What is claimed is:

1. A memory controller configured to receive access requests to access a memory, the memory controller comprising:
   a transaction scheduler circuit having a scheduler queue, wherein for each received access request, the transaction scheduler circuit is configured to allocate a new entry in the scheduler queue, store an access address corresponding to the access request as a data address into the new entry, generate an error correction code (ECC) address from the data address and store the ECC address into the new entry, and set a corresponding ECC mode field in the new entry to indicate whether the data address or ECC address of the new entry is to be exposed during arbitration; and
   a command queue, wherein the transaction scheduler circuit, during an arbitration cycle, is configured to select a transaction from the scheduler queue using an exposed address of each valid entry, and configured to provide the selected transaction to the command queue.

2. The memory controller of claim 1, wherein, when the selected transaction is selected with an exposed data address, the selected transaction corresponds to a data transaction, and when the selected transaction is selected with an exposed ECC address, the selected transaction corresponds to an ECC mode transaction.

3. The memory controller of claim 2, wherein:
   the data transaction comprises a read transaction to read application data from the memory or a write transaction to write application data to the memory, and
   the ECC mode transaction comprises a read transaction to read syndrome bits from the memory or to write syndrome bits to the memory.

4. The memory controller of claim 3, wherein the command queue is configured to, for each transaction in the command queue, provide a read command or write command to the memory in accordance with a first transaction ordering.

5. The memory controller of claim 1, wherein each valid entry of the scheduler queue is configured to store a corresponding data address for a data transaction and a corresponding ECC address for an ECC mode transaction, but is configured to expose only one of the corresponding data address and corresponding ECC address during arbitration based on a corresponding ECC mode field of the valid entry.

6. The memory controller of claim 5, wherein the transaction scheduler circuit, during arbitration, is configured to schedule the ECC mode transaction of a corresponding valid entry of the scheduler queue independently of the data transaction of the corresponding valid entry of the scheduler queue.

7. The memory controller of claim 6, wherein, during arbitration, the transaction scheduler circuit is configured to select at least one other transaction corresponding to another valid entry of the scheduler queue between scheduling the ECC mode transaction of the corresponding valid entry and scheduling the data transaction of the corresponding valid entry.

8. The memory controller of claim 1, further comprising:
   write buffers configured to store write data provided with received write access requests; and
   an error correction code (ECC) generator configured to generate syndrome bits corresponding to write data received with a corresponding write access request.

9. The memory controller of claim 8, wherein the write data for a received write access request is stored at a corresponding data address and the corresponding syndrome bits are stored at a corresponding ECC mode address generated from the corresponding data address.

10. The memory controller of claim 9, wherein the transaction scheduler circuit is configured to store the corresponding data address and a value indicative of the ECC mode address to a first entry of the scheduler queue, wherein the transaction scheduler circuit is configured to schedule an ECC mode transaction with the ECC mode address of the first entry prior to scheduling a data mode transaction with the data address of the first entry.

11. The memory controller of claim 10, wherein the transaction scheduler circuit is configured to delete the first entry after scheduling the data mode transaction with the data address of the first entry.

12. The memory controller of claim 9, wherein the transaction scheduler circuit is configured to store the corresponding data address and a value indicative of the ECC mode address to a first entry of the scheduler queue, wherein the transaction scheduler circuit is configured to schedule an ECC mode transaction with the ECC mode address of the first entry after scheduling a data mode transaction with the data address of the first entry.

13. A method of scheduling memory transactions, comprising:
   receiving a memory access request for accessing a memory, the memory access request having a corresponding access address;
   storing the access address to an allocated entry of a transaction scheduler, the access address providing a data address of a data transaction corresponding to the access request;
   using the data address to generate an error correction code (ECC) address of an ECC mode transaction corresponding to the access request;
   storing an indication of the ECC address into the allocated entry; and
   setting an ECC mode field corresponding to the access address in the allocated entry to indicate whether the data address or the ECC address of the allocated entry is exposed during arbitration.

14. The method of claim 13, further comprising:
during an arbitration cycle, selecting a transaction from the scheduler queue using exposed addresses of the scheduler queue;
if the selected transaction has an exposed ECC mode address, the selected transaction is an ECC mode transaction for reading syndrome bits from the memory or writing syndrome bits to the memory;
if the selected transaction has an exposed data address, the selected transaction is a data transaction for reading application data from the memory or writing application data to the memory; and
providing the selected transaction to a command queue.

15. The method of claim 14, further comprising:
when the selected transaction is the ECC mode transaction, setting an ECC mode field of an entry of the scheduler queue corresponding to the selected transaction to expose the data address during a future arbitration cycle, and
when the selected transaction is the data transaction, removing the entry of the scheduler queue corresponding to the selected transaction.

16. The method of claim 14, further comprising:
when the selected transaction is the data transaction, setting an ECC mode field of an entry of the scheduler queue corresponding to the selected transaction to expose the ECC address during a future arbitration cycle, and
when the selected transaction is the ECC mode transaction, removing the entry of the scheduler queue corresponding to the selected transaction.

17. The method of claim 14, further comprising:
providing a read command or write command to the memory for each transaction of the command queue in accordance with a first in first out (FIFO) ordering.

18. A memory controller configured to receive access requests to access a memory, the memory controller comprising:
a transaction scheduler circuit having a scheduler queue, wherein for each received access request, the transaction scheduler circuit is configured to allocate a new entry in the scheduler queue, store an access address corresponding to the access request as a data address into the new entry, generate an error correction code (ECC) address from the data address and store the ECC address into the new entry, and set a corresponding ECC mode field in the new entry to indicate whether the data address or ECC address of the new entry is to be exposed during arbitration,
wherein each valid entry of the scheduler queue is configured to store a corresponding data address for a data transaction and a corresponding ECC address for an ECC mode transaction, but is configured to expose only one of the corresponding data address and corresponding ECC address during arbitration based on an corresponding ECC mode field of the valid entry.

19. The memory controller of claim 18, further comprising:
a command queue, wherein the transaction scheduler circuit, during an arbitration cycle, is configured to select a transaction from the scheduler queue based on exposed addresses of the valid entries, and configured to schedule the selected transaction by providing the selected transaction to the command queue,
wherein the command queue is configured to provide a read command or write command to the memory for each transaction of the command queue.

20. The memory controller of claim 19, wherein the transaction scheduler circuit, during arbitration, is configured to schedule at least one other transaction corresponding to one or more entries of the scheduler queue between scheduling the ECC mode transaction of a valid entry and scheduling the data transaction of the valid entry.

* * * * *